March 27, 1951  F. F. REYNOLDS  2,546,523
MARSH VEHICLE
Filed Aug. 20, 1947

Inventor
F F REYNOLDS.
By Lester B. Clark
& Ray L. Smith
Attorneys.

UNITED STATES PATENT OFFICE 2,546,523

MARSH VEHICLE

Frank F. Reynolds, Houston, Tex.

Application August 20, 1947, Serial No. 769,732

2 Claims. (Cl. 115—1)

This invention relates to an improved amphibious craft for transporting personnel and equipment, such as exploration crews with seismographic instruments, to locations in swampy, inundated, or partially inundated terrain, and which craft can also serve with utility on snow covered terrain, and the like.

An object of the invention is to provide an amphibious craft which can transport crew and cargo loads into and over swampy, inundated, or partially inundated areas which may contain low-lying logs, hummocks, and other obstacles, and which craft can also serve with utility on snow covered terrain, and the like.

A further object of the invention is to provide an amphibious craft capable of readily transporting crew and cargo loads over inundated, or partially inundated areas which may contain low-lying logs, hummocks, and other obstacles by providing said craft with a hull construction consisting of transversely separated, parallel pontoon sections cross-connected at the tops thereof, so that the craft passes over and clears obstacles lying athwart that part of the path of progress of the craft traversed by the inter-space between pontoon sections.

A further object of the invention is to provide a highly maneuverable amphibious craft of this kind provided with propelling and traction mechanisms permitting operation of the traction element of one of the pontoons while the traction element of the other pontoon remains idle.

Still a further object of this invention is to provide a high load capacity amphibious craft of this kind capable of utilizing the full buoyant capacity of both pontoon sections, so that the craft can readily progress when heavily laden and submerged to a relatively low freeboard.

It is a further object of this invention to provide an amphibious craft of this kind wth traction elements which are equal to, or of greater transverse width than the transverse width of the pontoon sections which are encompassed by said traction elements, so that the traction elements transversely overhang above the pontoon sections on each side, and transversely under-lay below the pontoon sections on each side, thereby shielding the pontoon sections from retarding engagement with obstacles in the path of said craft.

It is still a further object of this invention to provide an amphibious craft of this kind capable of traversing hummocks and other terrain features through providing pontoons with upwardly extended or sloped end sections at bow and stern of such configuration as to permit the Caterpillar or traction elements mounted on and encompassing said pontoon sections to engage in and to pass over slopes and obstacles in the terrain.

Other and further objects of the invention will be readily apparent when the following description is considered in connection with the accompanying drawings wherein.

Figure 1:
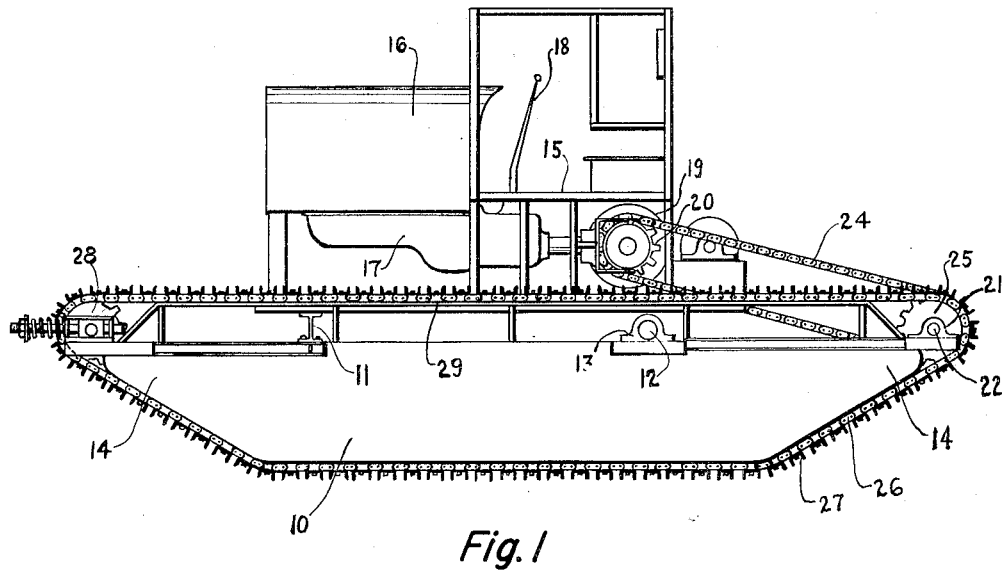
Fig. 1 is a side elevation, particularly showing the pontoon configuration, the traction elements, and the component structural features of a craft embodying the invention.
Figures 2, 3:
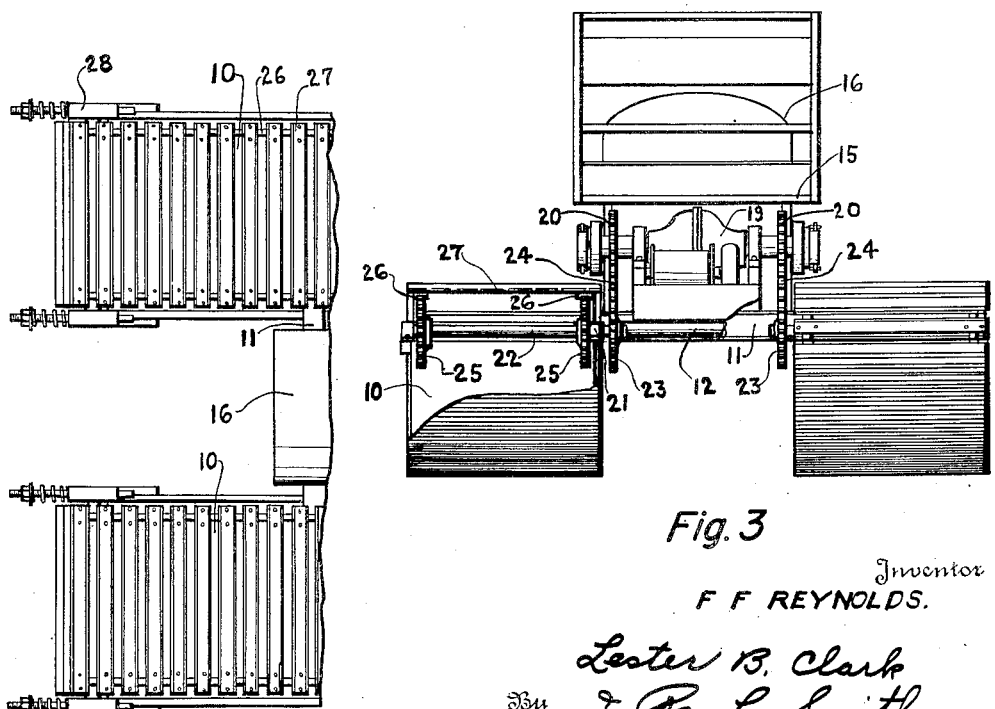
Fig. 2 is a plan of the bow of such craft, illustrating the over-hang of traction elements over pontoon sections.
Fig. 3 is a rear-end view, particularly illustrating the relative transverse pontoon and inter-space distances, and also showing cross-connection members, and the vertical clearance below said members.

In the drawings, pontoons 10, having upwardly sloped or tapered ends or nose sections 14, at bows and sterns, are shown rigidly cross-connected at their bows by means of an I-beam or other structural shape 11, which is firmly fixed to and in transverse alignment across the tops of each pontoon. These pontoons are also cross-connected at their after ends by means of shaft 12 which is journalled in pillow-blocks 13 which are rigidly mounted in alignment on each pontoon or hull section 10. By means of this construction there is provided a structure which possess desirable flexibility that the craft may readily pass over terrain having surface irregularities.

An operating and load carrying platform 15 is rigidly mounted at the forward end on I-beam 11, and at the after end on shaft 12. This platform has mounted thereon driving and steering mechanisms consisting of a hooded motor 16, gear box or transmission 17, a steering lever 18, and a differential 19, which has mounted in alignment on either end thereof the drive sprockets 20.

On top of the after end of each pontoon 10 there is mounted a bearing member 21 which has mounted therein a driven shaft 22. These shafts 22 have rigidly mounted on the inboard ends thereof the driven sprockets 23, which are in longitudinal alignment with the drive sprockets 20 on either end of the differential 19. Sprocket chains 24 serve to drivingly connect the drive sprockets 20 with the driven sprockets 23. Each driven shaft 22 has mounted thereon, at points adjacent to either pontoon side wall, chain belt driving sprockets 25.

The traction element for each pontoon 10 consists of an endless chain belt formed by two endless chains 26 which longitudinally encompass the pontoon near each side wall thereof. These endless chains 26 are joined together transversely by channels or slats 27, which are preferably spaced one chain link apart, and which are rigidly fixed on either side of the pontoon to transversely aligned, alternate chain links. These channels or slats 27 are of such length as to at least overlay and underlay the pontoon in transverse dimensions, so that any obstacle or obstruction in the path of the pontoon will be engaged by the slats or channels of the traction element, and consequently such obstacles cannot contact the body of the pontoons proper. A take-up sprocket 28 is mounted on either side of the forward end of each pontoon, and track structures 29 are rigidly mounted on top of, and on each side of, each pontoon. The traction elements or endless chain belts of each pontoon 10 encompass each pontoon by following the path formed by the driven sprockets 23, the track structures 29, the take-up sprocket 28, the forward nose section 14, the under side of the pontoon, and the after nose section 14. The traction elements are maintained at properly adjusted tension, so as to be constantly held at proper working contact against the pontoon bottoms and nose sections, by adjusting the take-up sprocket 28 in a forward or backward direction, as may be required.

While a specific construction has been shown and described, it is to be understood that such construction is merely illustrative of the invention and that the invention is not confined thereto.

Broadly the invention contemplates a highly maneuverable amphibious craft of a platform area and carrying capacity which will permit the transportation of personnel and equipment over marshy, inundated, or partially inundated areas, which may contain low-lying obstacles, sloped hummocks, and other terrain features.

What is claimed is:

1. An amphibious craft comprising, a pair of spaced elongated pontoons, spaced means at the top of and interconnecting said pontoons fore and aft in substantially parallel relation, a platform mounted upon said interconnecting means, transverse shafts on each of said pontoons at the opposite ends proximate the tops thereof, sprockets on each of said shafts, an endless belt passing about each pontoon and over said sprockets, an additional sprocket on the inner end of each of the rearmost shafts, a prime mover on said platform, a sprocket and chain connection between said prime mover and each of said additional sprockets, and means for selectively driving said sprocket and chain connections so that the craft is propelled and steered and may pass to and from water covered and land areas.

2. An amphibious craft comprising, a pair of spaced elongated pontoons, a beam interconnecting the forward ends of said pontoons, pillow blocks mounted on the rearward ends of said pontoons in alignment transversely thereof, a shaft pivotally mounted in said pillow blocks and interconnecting the rearward ends of the pontoons, a platform mounted on said beam and shaft, an endless belt passing movably about each of said pontoons, a prime mover on said platform, and means for selectively driving said endless belt from said prime mover so that the craft is propelled and steered and may pass to and from water covered and land areas.

FRANK F. REYNOLDS.

REFERENCES CITED

The following references are of record in the file of this patent:

UNITED STATES PATENTS

| Number | Name | Date |
| --- | --- | --- |
| 1,161,267 | Taylor | Nov. 23, 1915 |
| 1,366,413 | Olin | Jan. 25, 1921 |
| 2,138,207 | Roebling | Nov. 29, 1938 |

FOREIGN PATENTS

| Number | Country | Date |
| --- | --- | --- |
| 28,555 | Sweden | Mar. 21, 1910 |